United States Patent [19]

Patrick

[11] Patent Number: 5,143,020
[45] Date of Patent: Sep. 1, 1992

[54] POND FERTILIZING APPARATUS

[76] Inventor: Joseph H. Patrick, 507 E. Creswell Ave., Greenwood, S.C. 29646

[21] Appl. No.: 767,508

[22] Filed: Sep. 30, 1991

[51] Int. Cl.⁵ ............................................. A01K 61/00
[52] U.S. Cl. .................................... 119/3; 119/51.04; 210/198.1; 422/265
[58] Field of Search ............................. 119/3, 51.04; 210/198.1, 242.1; 422/265; 137/268

[56] References Cited

U.S. PATENT DOCUMENTS

| | | | |
|---|---|---|---|
| 2,711,714 | 6/1955 | Timeus | 119/5 |
| 2,761,422 | 9/1956 | Martin | 119/5 |
| 2,974,633 | 3/1961 | Whidden | 119/51.01 |
| 2,984,208 | 5/1961 | Kopietz | 119/51.03 |
| 3,512,505 | 5/1970 | Cross et al. | 119/51.04 |
| 3,598,536 | 8/1971 | Christensen | 210/242.1 X |
| 3,643,322 | 2/1972 | Poirot | 119/54 |
| 3,792,979 | 2/1974 | Clinton | 210/198.1 X |
| 3,845,902 | 11/1974 | Delamater | 239/314 |
| 4,630,634 | 12/1986 | Sasaki et al. | 422/265 X |
| 4,798,707 | 1/1989 | Thomas et al. | 422/265 X |
| 5,064,624 | 11/1991 | King | 422/265 X |

FOREIGN PATENT DOCUMENTS

| | | | |
|---|---|---|---|
| 143395 | 8/1903 | Fed. Rep. of Germany | 119/51.04 |
| 728806 | 4/1980 | U.S.S.R. | |

Primary Examiner—Gene Mancene
Assistant Examiner—Thomas Price
Attorney, Agent, or Firm—Dority & Manning

[57] ABSTRACT

An apparatus for dispensing a fertilizer in a pond which includes a floatation structure that has a receiver positioned therebelow. A funnel shaped opening is provided in the floatation structure through which fertilizer is dumped to deposit the fertilizer in the receiver wherein it is dissolved by water flow between the bottom of the floatation structure and the received.

4 Claims, 2 Drawing Sheets

POND FERTILIZING APPARATUS

BACKGROUND OF THE INVENTION

This invention relates to an apparatus for fertilizing ponds and more particularly to an apparatus wherein bags of fertilizer can be poured therein for dispersing the fertilizer in a pond.

Heretofore, when fertilizing ponds, people fertilizing the pond would often attempt to fertilize the pond by dumping bags of fertilizer from the banks into the pond. The problem with this method is that the fertilizer tended to concentrate in areas and also embed in the mud and not effectively disperse throughout the pond.

In an attempt to disperse the fertilizer throughout the pond, bags of fertilizer were loaded into a boat and as the boat was paddled around the pond, the fertilizer was dumped from the bags into the pond. While this would distribute the fertilizer throughout the pond, the problem is that fertilizer being heavier than water would drop to the bottom and become commingled with the mud in the bottom of the pond. This prevented efficient distribution and use of the fertilizer.

SUMMARY OF THE INVENTION

Apparatus for dispensing fertilizer in ponds comprising a floatation structure which has positioned therebelow a receiver. A funnel shaped opening is provided in the floatation structure so that fertilizer can be poured through the funnel shaped opening into the receiver. The receiver is spaced below the bottom of the floatation structure so that water can flow between the top of the receiver and the floatation structure for dissolving fertilizer dumped into the receiver. Such provides an efficient and uniform method for fertilizing fish ponds.

Accordingly, it is an important object of the present invention to provide an apparatus wherein granular fertilizer can be first dissolved in water before being dispersed throughout the pond.

Another important feature of the present invention is to provide an apparatus wherein granular fertilizer is released in a dissolved form over a period of time in a fishing pond.

Still another important object of the invention is to provide a simple and efficient way of dispensing granular fertilizer in a fishing pond.

DESCRIPTION OF THE PREFERRED EMBODIMENTS

Figure 1:
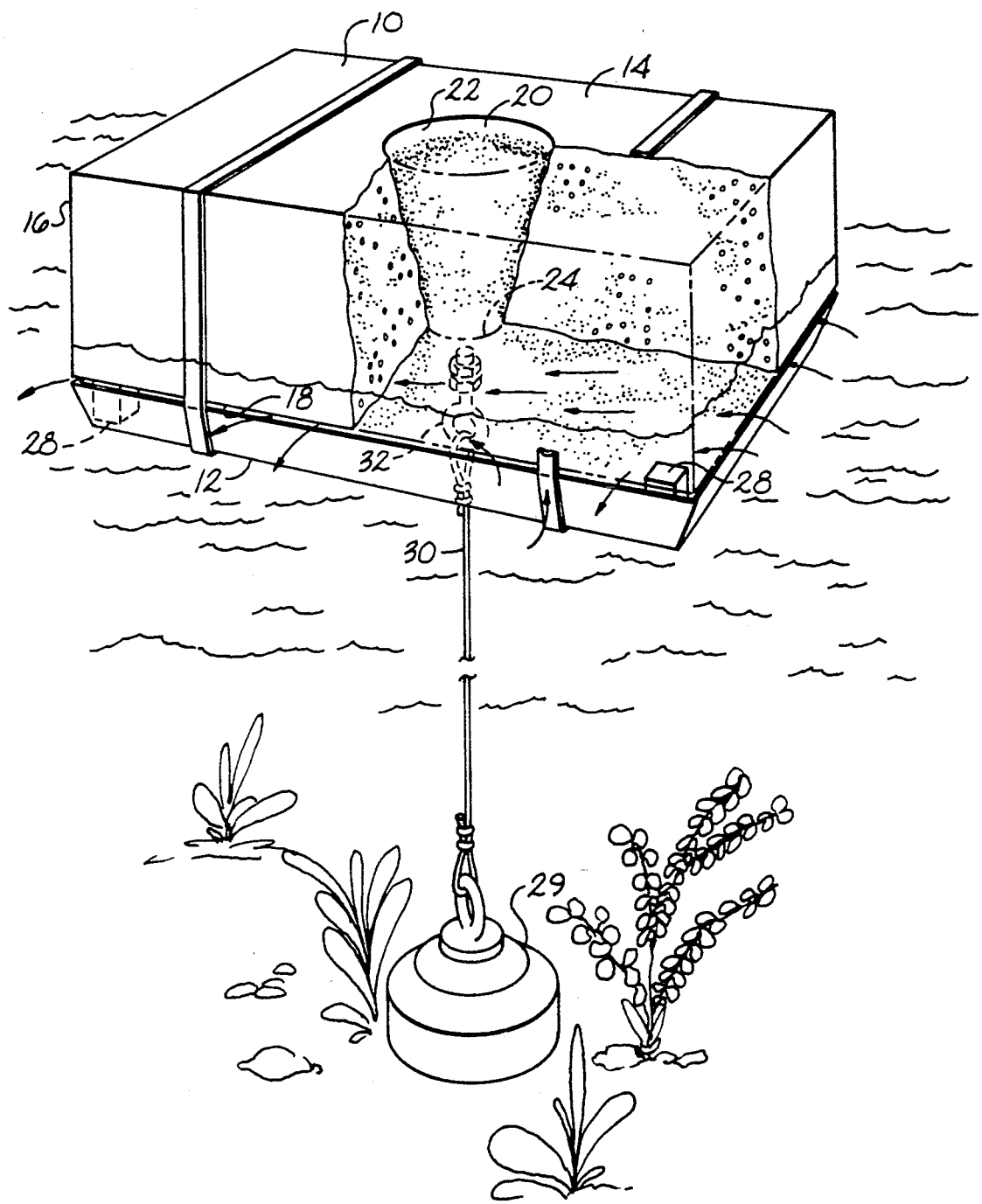
FIG. 1 is a prospective view illustrating an apparatus for dispensing fertilizer in a pond constructed in accordance with the present invention.

Referring to FIG. 1 of the drawings, there is illustrated a floatation structure which takes the form of a styrofoam block 10. The size of the styrofoam block depends on the amount of fertilizer that is to be dispensed by the apparatus. It is desired that the styrofoam block support a receiving tray adjacent the surface of the water in the pond with the tray being immersed in the water with the level of the water rising partially up the side of the styrofoam block. The styrofoam block is rectangular in shape and includes a top 14 which is joined by side walls 16 and a bottom 18. A funnel shaped opening 20 is provided in the styrofoam block and has an enlarged diameter end 22 adjacent the top wall of the styrofoam block and a smaller diameter opening 24 provided in the bottom 18 of the styrofoam block.

The tray 12 is carried by the styrofoam block and in one particular embodiment, metal straps 26 are used for securing the tray to the styrofoam block. Posts 28 are secured to the tray and the bottom of the styrofoam block 10 by any suitable means so as to space the tray 12 from the bottom surface 18 of the block. The purpose of providing the space between the bottom of the styrofoam block and the tray is to allow water to flow between the bottom of the styrofoam block and the tray.

In use, the styrofoam block is positioned in a pond and it can be secured in a particular location by dropping an anchor 29 which is secured to the tray by of a rope 30 that is connected to a eye bolt 32 screwed into the bottom of the tray. Granular fertilizer is dumped through the funnel-shaped opening 20 and collects in the tray 12. Over a period of time, the water flowing in the space provided between the bottom of the styrofoam block and the tray will dissolve the granular fertilizer and it will fertilize the water in the pond. Such provides a convenient and efficient way to disperse fertilizer in a fishing pond.

Figure 2:
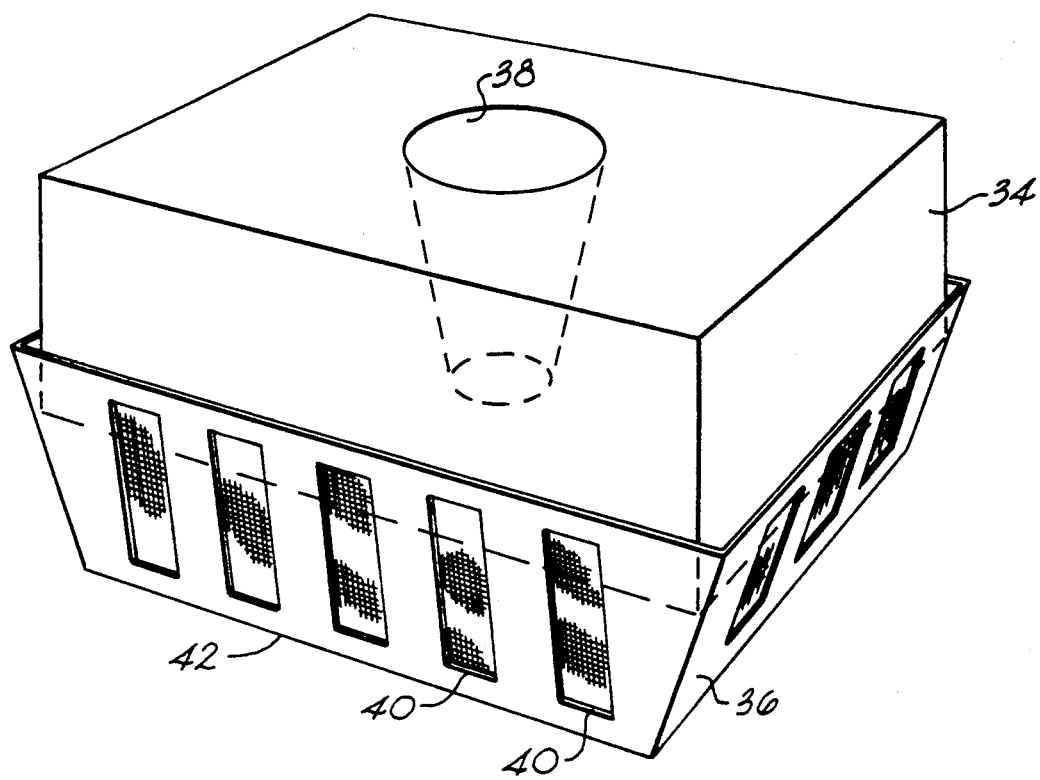
FIG. 2 is a prospective view of a modified form of the invention.

FIG. 2 discloses a modified form of the invention wherein a styrofoam block 34 of rectangular configuration similar to that shown in FIG. 1 is positioned on top of a plastic basket 36. The styrofoam block 34 has a funnel 38 provided therein into which granular fertilizer can be deposited. The lower side walls of the styrofoam block 34 extend into a rectangular plastic basket and is secured therein by any suitable means such as by bolts not shown.

The basket 36 has rectangular shaped windows 40 provided therein and has an opened bottom 42. The rectangular windows 40 and the open bottom 42 are lined with fine mesh screen wire so that when the fertilizer is deposited into the basket through the funnel shaped opening, it collects on the mesh screen wire covering the bottom of the basket. Water is allowed to flow through the windows 40 and the bottom to dissolve the fertilizer over a period of time and disperse the dissolved fertilizer in the fish pond.

The basket may be constructed of any suitable material such as plastic.

Figure 3:
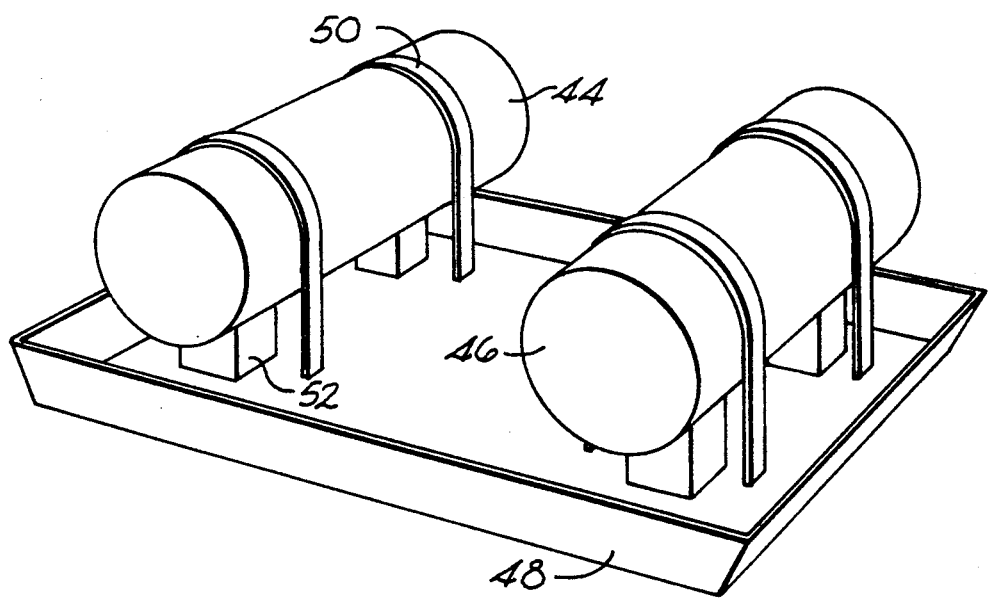
FIG. 3 is a prospective view of still another modified form of the invention.

FIG. 3 illustrates still another modified form of the invention wherein instead of using a styrofoam block, two 55 gallon barrels 44 and 46 are used for supporting an aluminum tray 48. The aluminum tray is attached to the barrels by means of straps 50. Spacers in the form of blocks 52 are used for molding the aluminum tray away from the bottom of the drums. In use, the fertilizer is dumped into the aluminum tray which is immersed in the water and will dissolve as the water flows thereover.

Other types of floatation devices could be utilized such as innertubes for supporting trays positioned therebelow.

While the drawings and accompanying description have been shown and describe a preferred embodiment of the present invention is to be understood that variations and modifications to the invention can be made without affecting the scope of the invention.

What is claimed is:

1. An apparatus for dispersing fertilizer in a pond comprising:
   a floatation structure,
   a receiver positioned below said floatation structure,
   said floatation structure including a styrofoam block,
   a funnel shaped opening provided in said styrofoam block having a large diameter opening adjacent a top of said styrofoam block and a smaller diameter opening adjacent a lower end of said block through which fertilizer is fed for being deposited in said receiver,
   said receiver having a bottom with side walls extending upwardly therefrom,
   said receiver being vertically spaced below said floatation structure,
   spacers carried between said receiver and said styrofoam block for fixing the space between a bottom portion of said block and said receiver,
   said floatation structure being of sufficient size to float on the surface of a body of water while permitting said receiver to be immersed below the surface of said water so that water can flow between said floatation structure and said receiver to dissolve any fertilizer deposited on said receiver.

2. The apparatus for dispersing fertilizer in a pond as set forth in claim 1 wherein said receiver is a metal tray.

3. An apparatus for dispersing fertilizer in a pond comprising:
   a pair of sealed barrels spaced from each other,
   a tray having a bottom and side walls for receiving fertilizer to be dispersed in said pond,
   means for securing said barrels to said tray with said tray being spaced vertically below said barrels so that when said apparatus is placed in a pond full of water, said barrels float adjacent the surface while said tray is immersed below said water level.

4. An apparatus for dispersing fertilizer in a pond comprising:
   a floatation structure,
   a receiver positioned below said floatation structure,
   a funnel shaped opening provided in said floatation structure having a large diameter opening adjacent a top of said floatation structure and a smaller diameter opening adjacent a lower end of said structure through which fertilizer is fed for being deposited in said receiver,
   said receiver having a bottom with side walls extending upwardly therefrom,
   said receiver being vertically spaced below said floatation structure,
   said floatation structure being of sufficient size to float on the surface of a body of water while permitting said receiver to be immersed below the surface of said water so that water can flow between said floatation structure and said receiver to dissolve any fertilizer deposited on said receiver,
   said receiver is a plastic basket having side walls and a bottom,
   openings provided in said side walls,
   wire mesh extending over said openings in said side walls, and
   said bottom having an opening provided therein, said opening in bottom being covered by wire mesh so as to retain said fertilizer in said basket until said water flowing through said openings in said side walls and said bottom dissolves said fertilizer.

* * * * *